US010142541B2

(12) United States Patent
Kaida (10) Patent No.: US 10,142,541 B2
(45) Date of Patent: Nov. 27, 2018

(54) IMAGE PROCESSING APPARATUS, IMAGING APPARATUS, AND CONTROL METHOD OF IMAGE PROCESSING APPARATUS

(71) Applicant: CANON KABUSHIKI KAISHA, Tokyo (JP)

(72) Inventor: Hironori Kaida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 15/435,163

(22) Filed: Feb. 16, 2017

(65) Prior Publication Data

US 2017/0280055 A1    Sep. 28, 2017

(30) Foreign Application Priority Data

Mar. 23, 2016  (JP) ................................. 2016-058810

(51) Int. Cl.
| | |
|---|---|
| H04N 5/232 | (2006.01) |
| G06T 11/60 | (2006.01) |
| G06T 7/11 | (2017.01) |
| G06T 7/168 | (2017.01) |
| G06T 7/246 | (2017.01) |
| G06T 7/33 | (2017.01) |
| G06T 3/40 | (2006.01) |

(52) U.S. Cl.
CPC ....... *H04N 5/23238* (2013.01); *G06T 3/4038* (2013.01); *G06T 7/11* (2017.01); *G06T 7/168* (2017.01); *G06T 7/246* (2017.01); *G06T 7/33* (2017.01); *G06T 11/60* (2013.01); *G06T 2207/10016* (2013.01)

(58) Field of Classification Search
CPC . G06T 7/11; G06T 7/168; G06T 7/246; G06T 7/33; G06T 3/4038; G06T 11/60; G06T 2207/10016; H04N 5/23238
See application file for complete search history.

(56) References Cited

U.S. PATENT DOCUMENTS

2005/0259888 A1*  11/2005  Ozluturk ............ H04N 5/23248
                                                   382/260

FOREIGN PATENT DOCUMENTS

| JP | 2004134993 A | 4/2004 |
|---|---|---|
| JP | 200927437 A | 2/2009 |

* cited by examiner

*Primary Examiner* — Huy T Nguyen
(74) *Attorney, Agent, or Firm* — Canon U.S.A., Inc. IP Division (57) ABSTRACT

An image processing apparatus determines whether a feature amount in a partial region of an image satisfies a preset condition, selects a second image to be combined with a first image from a plurality of images based on the result of the determination, and performs a composition process on the aligned first image and second image based on a motion vector between these images. From the plurality of images, the image processing apparatus selects as the second image at least any one of an image having a partial region with the feature amount determined to satisfy the preset condition and an image corresponding to a partial region out of a plurality of partial regions set in the first image with the feature amount determined to satisfy the preset condition.

14 Claims, 10 Drawing Sheets

REFERENCE IMAGE

TEMPLATE

VECTOR EXTRACTION IMAGE

IMAGE SET

FIG. 5B

ALIGNMENT COEFFICIENT FOR
IMAGE CORRECTION

IMAGE PROCESSING APPARATUS, IMAGING APPARATUS, AND CONTROL METHOD OF IMAGE PROCESSING APPARATUS

BACKGROUND OF THE INVENTION

Field of the Invention

The present invention relates to a technique for combining a plurality of continuously captured images.

Description of the Related Art

In conventional imaging apparatuses such as cameras, the photographable field angle is limited by the characteristics of the shooting lens. To shoot images in a wide range, it is necessary to sacrifice resolution. In addition, the aspect ratio of acquirable images is also limited by hardware.

There is a conventional technique of panoramic composition to address the foregoing problems. In the panoramic composition, a plurality of images with overlapped regions is combined to generate a large image. Using this method makes it possible to acquire a wider image beyond the characteristics of the lens. In addition, combining the plurality of images makes it possible to change the aspect ratio.

To acquire a composite image without strangeness by the panoramic composition described above, the alignment of the images on the imaging apparatus is essential. Japanese Patent Laid-Open No. 2004-134993 proposes a method by which to perform the alignment using motion vectors. According to this method, the motion vectors are detected using the feature amounts obtained from contrasts, luminance components, or color difference components of different images to be combined.

The larger the sizes of captured images are, the larger the load of vector calculation to be used for the alignment of the images to be combined becomes. Japanese Patent Laid-Open No. 2009-27437 discloses determining the motion vectors not from the entire images but from only the partial regions of the images.

However, when the partial regions set for obtaining the motion vectors are from feature-less images, the high-accuracy detection of the motion vectors is difficult, and it can be impossible to provide favorable panoramic composition.

SUMMARY OF THE INVENTION

According to an aspect of the present invention, an image processing apparatus generates a favorable composite image even when a plurality of acquired images includes an image with a smaller feature amount of a subject.

To solve the foregoing problems of conventional techniques, in accordance with another aspect of the present invention, an image processing apparatus includes a determination unit, a selection unit, a motion vector detection unit, and a composition unit. The determination unit determines whether the feature amount in a partial region of an image satisfies a preset condition. From a plurality of images, the selection unit selects a second image to be combined with a first image based on the result of determination by the determination unit. The motion vector detection unit detects a motion vector between the first image and the second image. The composition unit performs a composition process on the aligned first image and second image. Moreover, from the plurality of images, the selection unit selects as the second image at least any one of an image having a partial region with the feature amount determined to satisfy the preset condition and an image corresponding to a partial region out of a plurality of partial regions set in the first image with the feature amount determined to satisfy the preset condition.

Further features of the present invention will become apparent from the following description of exemplary embodiments (with reference to the attached drawings).

DESCRIPTION OF THE EMBODIMENTS

Various example embodiments of the present invention will be explained below with reference to the drawings. In the following description, a digital camera will be taken as an example of imaging apparatus. However, the present invention is not limited to the configurations discussed below.

First Embodiment

<Configuration of the Imaging Apparatus>

Figure 1:
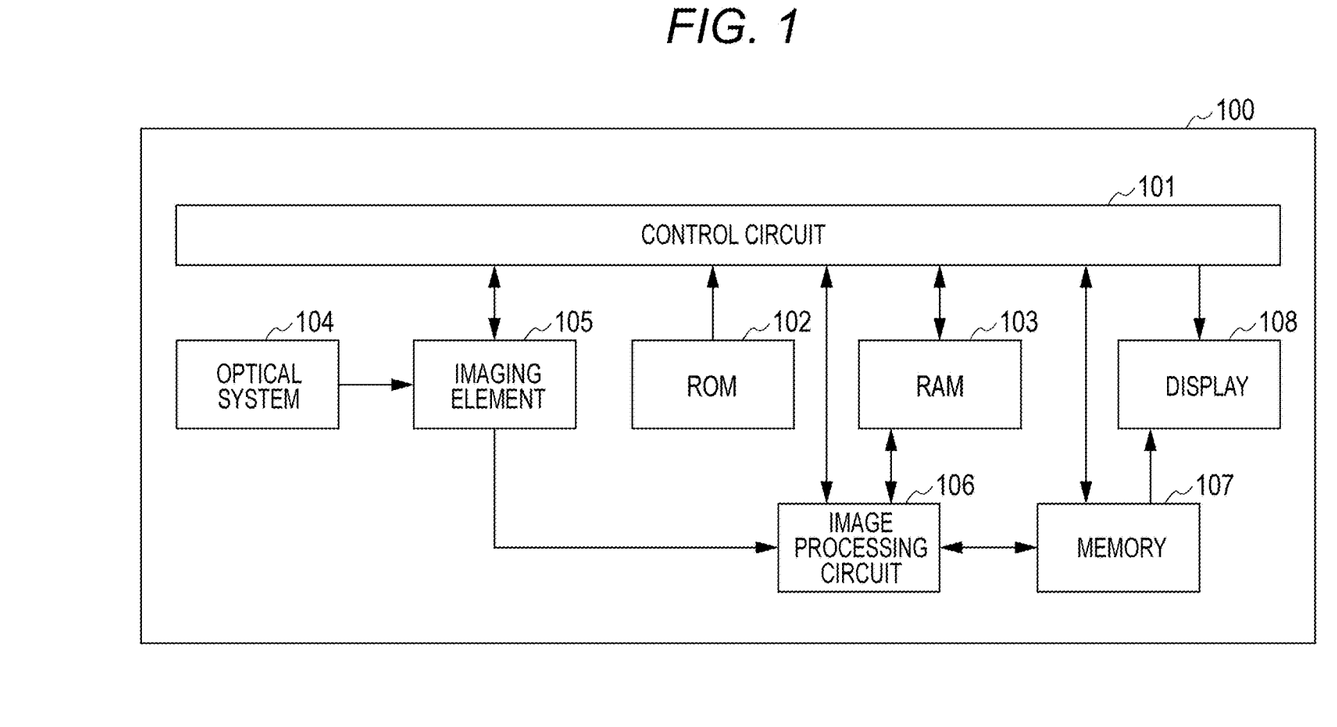
FIG. 1 is a block diagram of a functional configuration of a digital camera according to a first embodiment.

FIG. 1 is a block diagram of a functional configuration of a digital camera 100 according to an embodiment of the present invention. A control circuit 101 is a signal processor such as a CPU or an MPU. The control circuit 101 reads operation programs for blocks included in the digital camera 100 from a ROM 102 and unfolds them to an RAM 103 for program execution to control operations of the blocks included in the digital camera 100. The ROM 102 is a rewritable non-volatile memory that stores the operation programs for the blocks included in the digital camera 100 and parameters and others necessary for the operations of the blocks. The control circuit 101 performs control while reading the parameters and the like necessary for the control such as the operation programs from the ROM 102. The RAM 103 is a rewritable volatile memory that is used as a temporary storage region for data output at the time of operations of the blocks included in the digital camera 100.

An optical system 104 forms an image of a subject on an imaging element 105. The imaging element 105 is an imaging element such as a CCD sensor or a CMOS sensor that converts photoelectrically an optical image formed by the optical system 104 on the imaging element, and outputs the obtained image signal to an image processing circuit 106.

The image processing circuit 106 applies various kinds of image processing such as white balance adjustment, color interpolation, and filtering to the image output from the imaging element 105 or the image data stored in the RAM 103. The image processing circuit 106 is composed of an application specific integrated circuit (ASIC) formed by collecting circuits for performing specific operations. Alternatively, the control circuit 101 may conduct operations according to the programs read from the ROM 102 to perform some or all of the functions of the image processing circuit 106. In the case where the control circuit 101 also performs all of the functions of the image processing circuit 106, it is not necessary to have the image processing circuit 106 as hardware.

A memory 107 is a memory card, a built-in memory, or the like that stores images processed by the image processing circuit. In addition, the memory 107 outputs the images to be processed to the image processing circuit 106 under instructions from the control circuit 101.

A display 108 is composed of a display device such as a liquid crystal display (LCD) or an organic EL display. The display 108 displays various kinds of information in such a manner as to acquire a subject image taken by the imaging element 105 through the control circuit 101 and display it in real time or display the images recorded in the memory 107.

<Operations of the Digital Camera>

The operations of the digital camera 100 after a panoramic shooting mode is set by the user and a release operation is performed will be explained below. In the following explanation, the digital camera is panned as an example. However, the same technology is applicable to the case where the digital camera is tilted.

Figure 2:
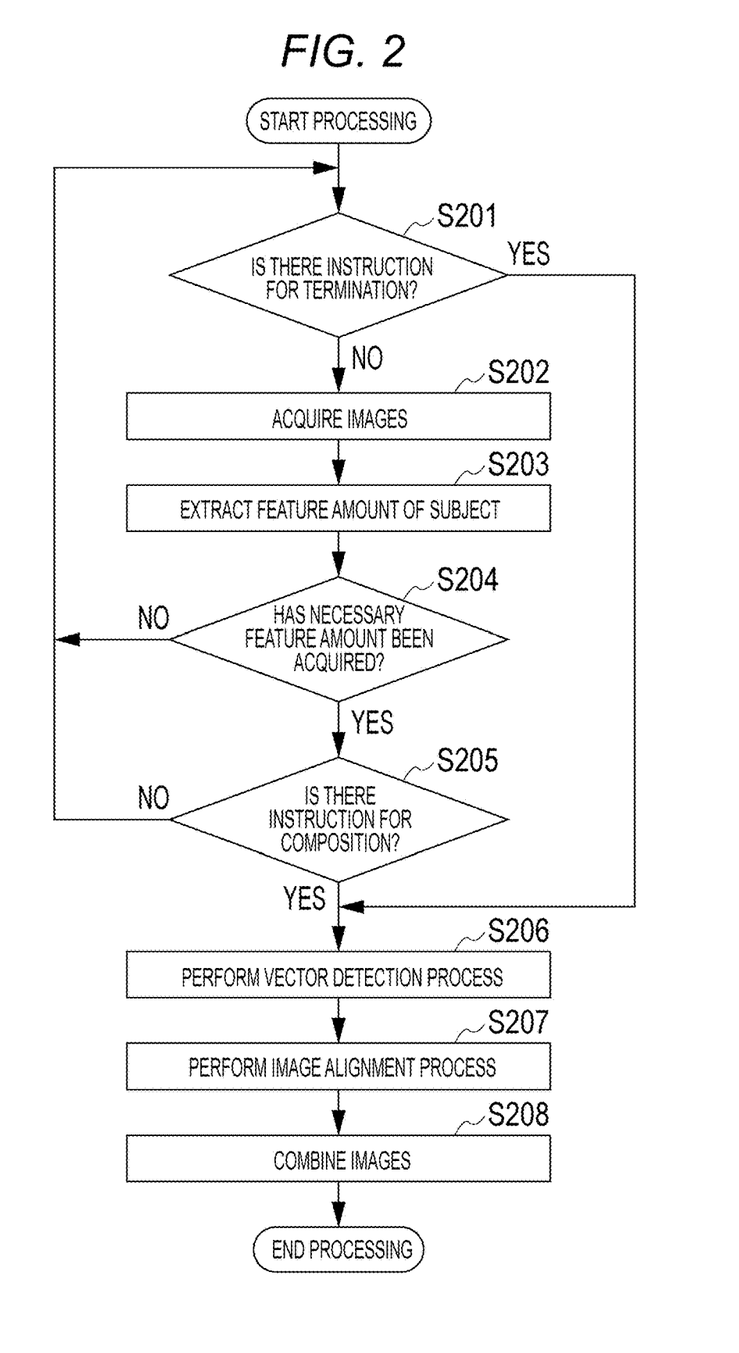
FIG. 2 is a flowchart of operations of the digital camera according to the first embodiment.

FIG. 2 is a flowchart of operations of the digital camera 100 according to the first embodiment. When the release operation is performed by the user, the digital camera 100 starts the operations at step S201 and the subsequent steps.

At step S201, the digital camera 100 determines whether there is an instruction for terminating panoramic shooting. For example, the digital camera 100 determines that there is an instruction for terminating when the release operation is performed again by the user during shooting or the digital camera 100 is panned by a predetermined amount in a direction opposite to the previous one. When there is no instruction for terminating, the digital camera 100 moves to step S202, and when there is an instruction for terminating, the digital camera 100 moves to step S206. Step S201 may be skipped before shooting of the first frame.

At step S202, the imaging element 105 converts the subject image formed by the optical system 104 to an image and outputs the same to the image processing circuit 106 under an instruction from the control circuit 101.

At step S203, the image processing circuit 106 extracts the feature amount of the subject from the image. The feature amount of the subject is used to determine whether a motion vector can be detected at high accuracy. A method of extracting the feature amount of the subject will be explained below in detail with reference to FIGS. 3A, 3B, 4A, 4B, and 4C, taking the calculation of contrasts as an example. The contrasts are here calculated as the feature amount because selecting textures including a large number of edge parts with higher contrasts would make it possible to determine correctly the vector between the images.

Figure 3A:
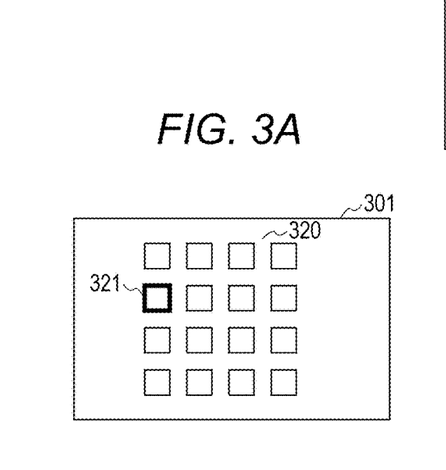
FIGS. 3A and 3B are diagrams for describing a process of template matching according to an embodiment of the present invention.
Figure 3B:
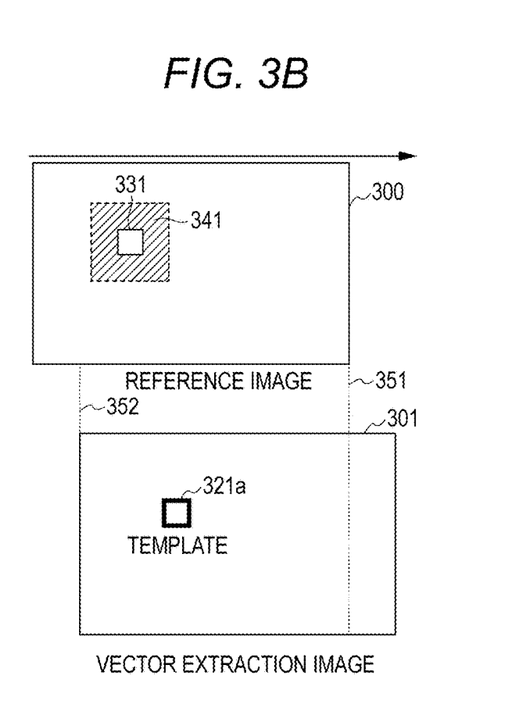

The region from which the feature amount of the subject is extracted and the vector detection region for use in extraction of a vector in the vector detection process at step S206 described later are set in pre-decided positions. FIGS. 3A and 3B illustrate two images acquired continuously in terms of time. FIG. 3A illustrates a vector detection image (the temporally later one of the two images) that indicates a vector detection image group with reference sign 320. The images included in the vector detection regions of the vector detection region group 320 are used as template images 321 at the time of vector detection. One each vector is determined for the individual template images.

Figure 4A:
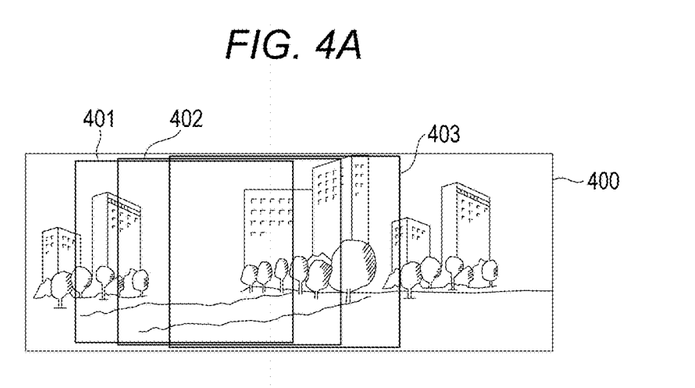
FIGS. 4A to 4C are diagrams for describing contrast extraction regions from which contrasts are extracted according to the first embodiment.
Figure 4B:
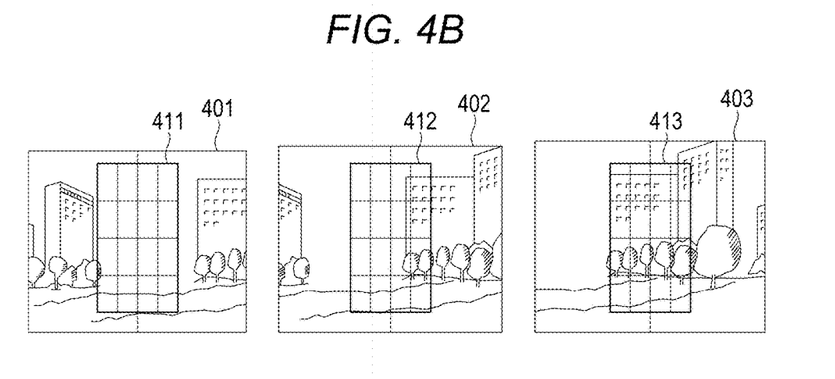
Figure 4C:
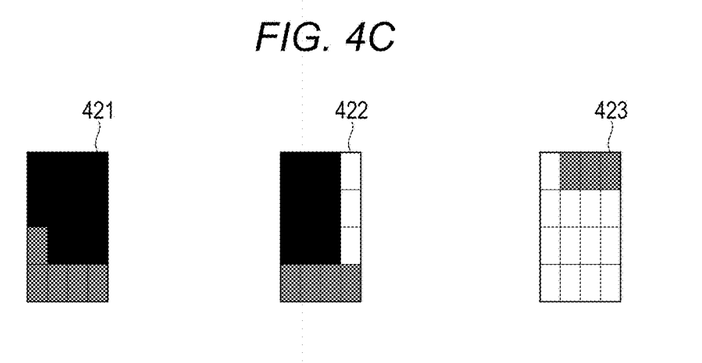

FIGS. 4A to 4C are diagrams for describing contrast extraction regions from which contrasts are extracted and the extracted contrasts. A region 400 refers to an imaging target. Regions 401 to 403 are regions corresponding to the individual images shot while panning. In this example, the regions 401 to 403 are slightly different in size because lines are drawn so as not to overlap one another for visibility, and it should not be interpreted that the regions 401 to 403 are always different in size. In general, contrast extraction regions 411 to 413 do not occupy the entire images in the regions 401 to 403 but occupy the partial regions for reduction of a calculation load. In addition, the contrast extraction regions 411 to 413 are preferably positioned in or near the centers of the regions 401 to 403 because distortion is likely to occur on the both sides of the image formed by the optical system.

The contrast extraction regions 411 to 413 have small regions that are the same in number as the vector detection regions included in the vector detection region group 320. The individual small regions contain any one of the vector detection regions. The image processing circuit 106 detects the edges of the small regions in the contrast extraction regions 411 to 413, performs integration processing, mean-value processing, and the like on the detected edges, and represents the output values as contrasts. FIG. 4C illustrates the results of the calculated contrasts in the contrast extraction regions 411 to 413 illustrated in FIG. 4B. In contrast extraction regions 421 to 423 illustrated in FIG. 4C, white regions have high contrasts and black regions have low contrasts. FIGS. 4A to 4C illustrate one example of contrast extraction regions, and the contrast extraction regions may be allocated to the entire images or to partial regions of the image different from those in FIGS. 4A to 4C, as far as the contrast extraction regions are positioned corresponding to the vector detection region group 320. For example, when a plurality of small regions in the contrast extraction regions overlays one vector detection region 321, the total sum or mean value of the contrasts obtained from the plurality of small regions may be handled as the contrast corresponding to the one vector detection region 321.

At step S204, the control circuit 101 determines whether the feature amounts necessary for alignment processing were acquired at step S203. When determining that the feature amounts necessary for alignment processing were acquired, the control circuit 101 moves to step S205. When not determining that the feature amounts necessary for alignment processing were acquired, the control circuit 101 returns to step S201 to acquire newly images. When the series of operations is carried out while the user is performing the panning operation, the acquired images are images changed in composition in the panning direction.

A method of determining whether the feature amounts necessary for alignment processing was acquired in the case where the feature amounts of the subject are contrasts. First, at step S203, the contrasts as the feature amounts of the subject extracted from the small regions of the contrast extraction regions 411 to 413 are compared to a reference value. When the contrasts are equal to or larger than the reference value, high-accuracy vector detection results can be obtained in the vector detection regions corresponding to the small regions from which the contrasts were obtained. This determination is made on all the small regions in the contrast extraction regions of one image, and it is determined whether the number of the small regions with contrasts equal to or larger than the reference value is equal to or larger than a threshold. In general, three or more vectors are necessary in the case of affine transformation, and four or more vectors are necessary in the case of projective transformation, although it depends on the number of vectors necessary for alignment processing at step S208 and a method for geometric deformation processing. Accordingly, the threshold for the number of the small regions with contrasts equal to or larger than the reference value is set to three or more in the case of affine transformation or four or more in the case of projective transformation.

Alternatively, as the feature amounts of the subject, not contrasts but whiteout or underexposure regions may be detected. In this case, brightness information is acquired and compared to a predetermined threshold for whiteout or underexposure determination. It is determined how many vector extraction regions without whiteout or underexposure are left.

In the foregoing determination, the two examples of "contrast determination" and "whiteout and underexposure determination" are taken. However, the determination method is not limited to them as far as any other method makes it possible to determine whether high-accuracy vectors can be detected.

The control circuit 101 repeats steps S202 to S204 to acquire images that include small regions with contrast values determined to be equal to or larger than the reference value and are larger in number than the threshold. Executing these steps makes it possible to obtain the images in which motion vector detection can be reliably conducted in the vector detection at step S206 described later. Without the determination at step S204, the vector detection at step S206 may be started before the necessary feature amounts are obtained, and so may result in failed vector detection or generation of an unnatural composite image.

At step S205, when there is an instruction for combining, the control circuit 101 terminates the repeated processing and moves to step S206. The instruction for combining may be provided by the user operating the button or may be given automatically when a condition preset by the user to the imaging apparatus (the number of images, total width, size, or the like) is satisfied. This step is intended to stop the acquisition of images and start vector detection when a sufficient number of images for use in image composition has been acquired even without an instruction for determination.

At step S206, the image processing circuit 106 selects a plurality of images in which the number of small regions with contrasts determined to be equal to or larger than the reference value is equal to or larger than the threshold. Then, the image processing circuit 106 detects the motion vectors between the images. The motion vectors are detected with the vector detection regions corresponding to the small regions with the contrast values included in the images determined to be equal to or larger than the reference value as reference images. A method for detecting the motion vectors may be any one of publicly known methods, and a template matching method can be taken as an example. According to this method, the displacement amounts between the images are compared to a template in a predetermined range, and the shift amount at the position with the smallest comparison value (at the position with the highest correlation between the images) is detected as a vector.

The template matching will be explained with reference to FIGS. 3A and 3B. To perform template matching, a template 321a is decided from the vector detection region group in the vector detection image to detect the shift amount. In this embodiment, the vector detection region group is set only in a partial region of the image, which makes it possible to reduce a calculation load necessary for detection of the motion vectors as compared to the case where the motion vectors are detected from the entire image. The template 321a may be set only in the vector detection regions corresponding to the small regions with contrasts determined to be equal to or larger than the reference value at step S203 described in FIG. 2. The corresponding region between a reference image 300 and a vector detection image 301 (in a range where the same subject is seen) is represented between dotted lines 351 and 352. The region of the template 321a decided from the vector detection image and the region of the reference image corresponding to the template 321a are set as vector search start position. The region of the reference image on the same coordinates as those of the template 321a in the vector detection image is assumed as a region 331 of the reference image. Then, the template 321a is compared to a vector search region 341 centered on the region 331 and set to be wider than the region 331 to detect a displacement from the position with the highest correlation to the vector search start position as a motion vector. This operation is performed on all the set template images to detect a number of motion vectors corresponding to the number of the template images.

At step S207, the image processing circuit 106 perform alignment processing on ones of the images acquired at step S202 from which it is determined at step S204 that the necessary feature amounts were extracted by the use of the motion vectors detected at step S206. The alignment processing will be explained below in detail with reference to FIGS. 5A and 5B.

Figure 5A:
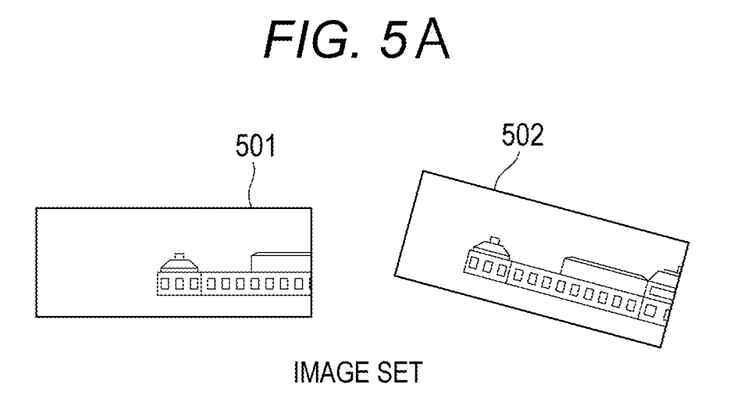
FIGS. 5A and 5B are diagrams for describing alignment according to an embodiment of the present invention.
Figure 5B:
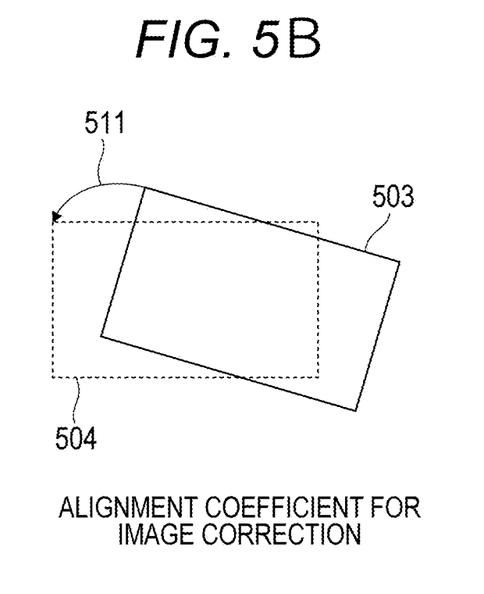

To perform the alignment processing, an alignment coefficient is calculated to correct the amount of deformation between the images. The alignment coefficient will be explained with reference to FIGS. 5A and 5B. In FIG. 5A, an image 501 and an image 502 are images from which it is determined at step S204 that the necessary feature amounts were extracted, and the image 502 is the alignment target image. Correction processing performed at the alignment of the images is actually applied not only to a translation component corresponding to the panning operation of the digital camera as illustrated in FIG. 4B. With camera shake in addition to the translation component, the components of rotation and tilt are generated. As a result, an image influenced by the rotation and tilt may be acquired as the image 502. In such a case, a transform coefficient is calculated as a coefficient for correcting the translation component, the rotation component, and the tilt component by geometric deformation. The transform coefficient for geometric deformation is called alignment coefficient. For example, the image 502 before the geometric deformation can be schematically represented as a frame 503, and the image 502 after the geometric deformation can be schematically represented as a frame 504. Alignment coefficient A equivalent to an arrow 511 is generally expressed by equation (1). When the coordinates of the image are assumed as I (x coordinate, y coordinate), the geometric transform takes place from the frame 503 to the frame 504 by calculating equation (2).

[Equation 1]

$$A = \begin{pmatrix} a & b & c \\ d & e & f \\ g & h & i \end{pmatrix} \quad \text{Equation (1)}$$

[Equation 2]

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad \text{Equation (2)}$$

To calculate the alignment coefficient, two images are set; the image as an alignment reference and the image as a target to be corrected. Of the images from which it is determined at step S204 that the necessary feature amounts were extracted, the image of the frame immediately after the reference image is the image as a target to be corrected. Then, the vectors are calculated by template matching as explained above with reference to FIGS. 3A and 3B.

Subsequently, a geometric transform coefficient is determined by the use of the determined vector group. For example, as shown in equation (2), a predetermined transform coefficient A with a smallest difference ε between coordinates I' obtained by multiplying the coordinates I of a feature point of the image as a target to be corrected by the transform coefficient A and the coefficients of a feature point of the reference image is determined.

As a method for determining the transform coefficient A, any one of publicly known optimization techniques is used such as Newton's method or Gauss-Newton method. The determined transform coefficient A is utilized as alignment coefficient.

Figure 6:
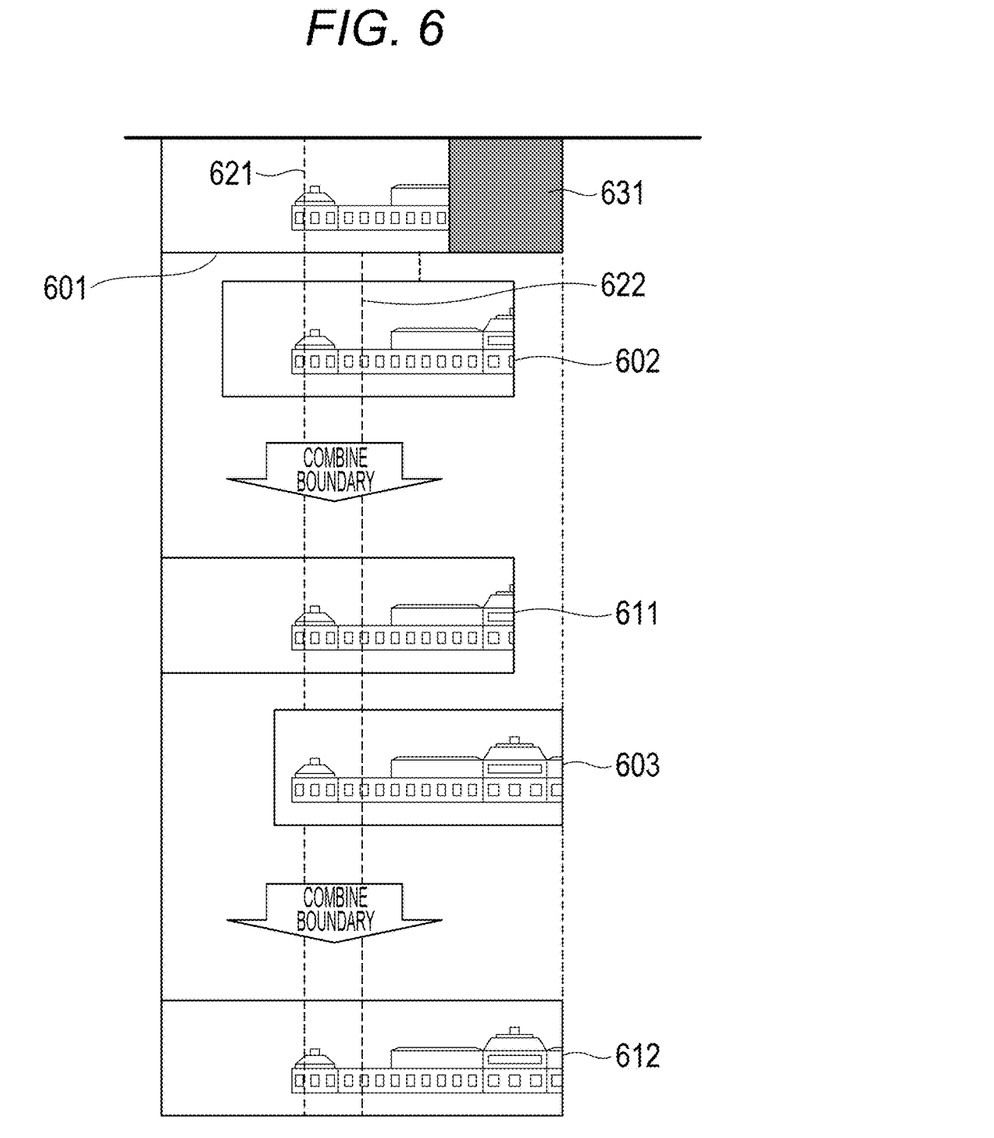
FIG. 6 is a diagram for describing generation of a composite image according to an embodiment of the present invention.

At step S208, image composition processing is performed on the images undergone the alignment processing at step S207 to combine the boundaries and their neighborhoods between the images and connect the images. The image composition processing will be explained with reference to FIG. 6. Images 601 to 603 illustrated in FIG. 6 are images after the alignment processing. These three images are sequentially combined at the boundary parts between them.

To combine the image 601 and the image 602, they are combined with a line 621 in the horizontal center of the image 601 as a boundary. Specifically, the image 601 is output to the region on the left of the line 621, the image 602 is output to the region on the right of the line 621, and pixel information on the both images is mixed on the line 621 to make the seam appear natural. Alternatively, a combined value of 50% of the pixel information on the image 601 and 50% of the pixel information on the image 602 is output on the line, and the two images are combined such that the ratio of the image 601 is larger on the left side of the line and the ratio of the image 602 is larger on the right side of the line with increasing distance from the line. The image after the composition constitutes a composite image 611.

Subsequently, the composite image 611 and the image 603 are combined. In this case, these images are combined with a line 622 in the horizontal center of the preceding image 602 as a boundary. The image after the composition constitutes a composite image 612. In such a manner as described above, the image composition is performed after sequential alignment. Combining with the image 602 and the image 603 makes it possible to increase the field angle of the image 601 by the size of the region 631.

According to the first embodiment, even though there are few subjects with feature amounts such as contrasts in adjacent regions as in the regions 401 to 403 illustrated in FIGS. 4A to 4C, it is possible to generate a favorable panoramic image without failure at the stages of vector detection and composition. In the case of combining all the acquired images, even though there is any region with a small feature amount such as the region 412 of the image 402, vector detection will also be conducted from the region with a small feature amount for image composition. As a result, the vector detection may fail and bring about improper alignment to produce an unnatural composite image, thereby wasting the series of operations. According to the foregoing method, it is possible to generate a natural composite image in a waste-less manner from the image 403 with the region 413 from which the vector is easier to detect without having to use the image 402.

In the first embodiment explained above, a composite image is generated while capturing images in time sequence, for example. Alternatively, all the images shot in time sequence may be stored before the generation of a composite image. In this case, the initially captured image may not necessarily be the reference image but the lastly captured image may be set as an initial reference image or an image in an arbitrary frame may be set as an initial reference image.

In addition, it is not necessary to perform the determination process at step S204 on all the images captured in time sequence. When the panning speed is slow, the overlapped regions between the images can be sufficiently obtained even though several frames of images for use in composition are skipped. Accordingly, when it is detected that the panning speed of the digital camera 100 is slow by a gyro or the like, the determination process at step S204 may be performed on every several frames.

At step S206 described in FIG. 2, the motion vectors are detected from the images in which the numbers of small regions with contrasts determined to be equal to or larger than the reference value are equal to or larger than the threshold, but the method for the motion vector detection is not limited to this. Alternatively, the motion vectors may be detected from all the images at step S206, and the images in which the numbers of small regions with contrasts determined to be equal to or larger than the reference value are equal to or larger than the threshold may be selected in the alignment processing at step S207. This configuration provides the advantage that two processes of feature amount extraction and motion vector detection can be performed in parallel.

Second Embodiment

Figure 7:
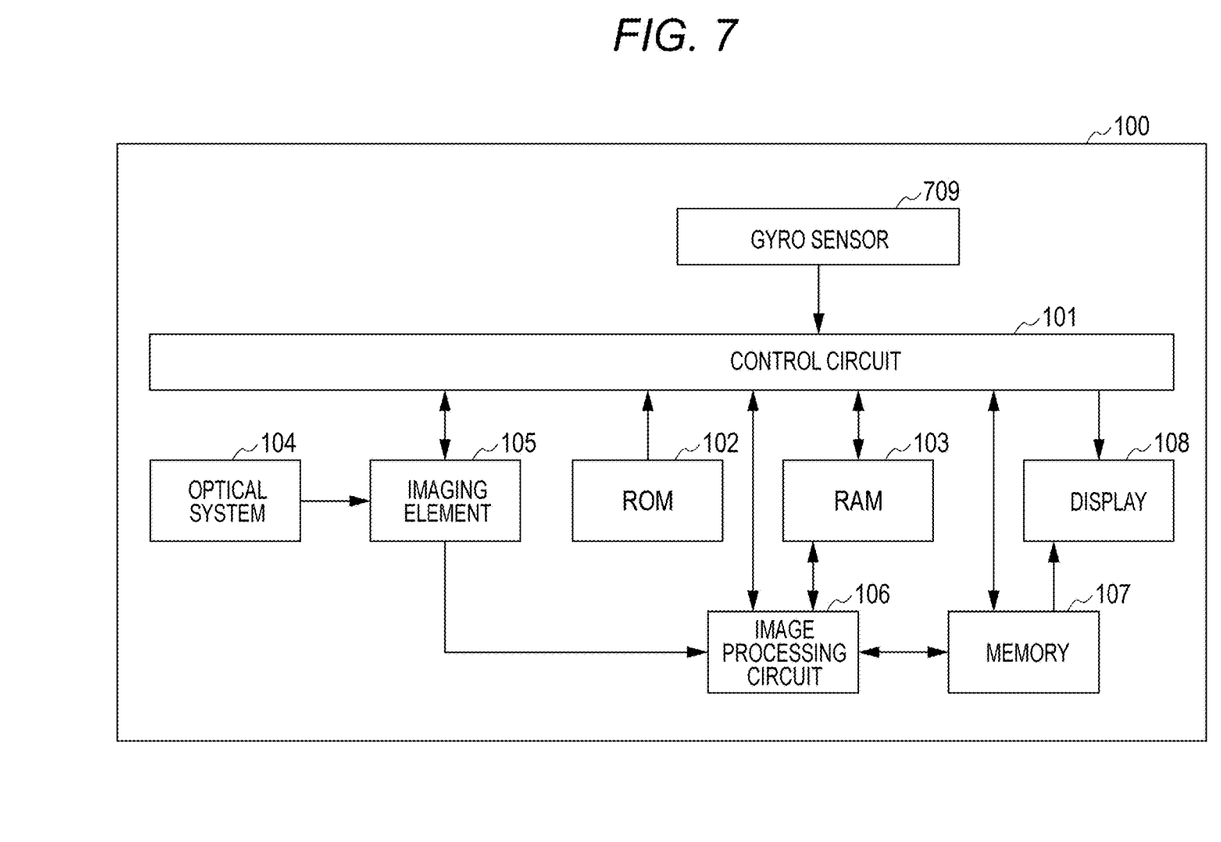
FIG. 7 is a block diagram of a functional configuration of digital cameras according to a second embodiment and a third embodiment.

In a second embodiment, a digital camera 100 has a gyro sensor as illustrated in FIG. 7 unlike in the first embodiment. A gyro sensor 709 is a device that detects the motion of the digital camera 100, specifically, detects changes in the angle of the digital camera 100 per unit time, that is, detects the motion of the digital camera 100 in yaw direction and pitch direction based on the angular speed. The gyro sensor may be replaced with another device capable of detecting quantitatively the motion of the digital camera.

Figure 8:
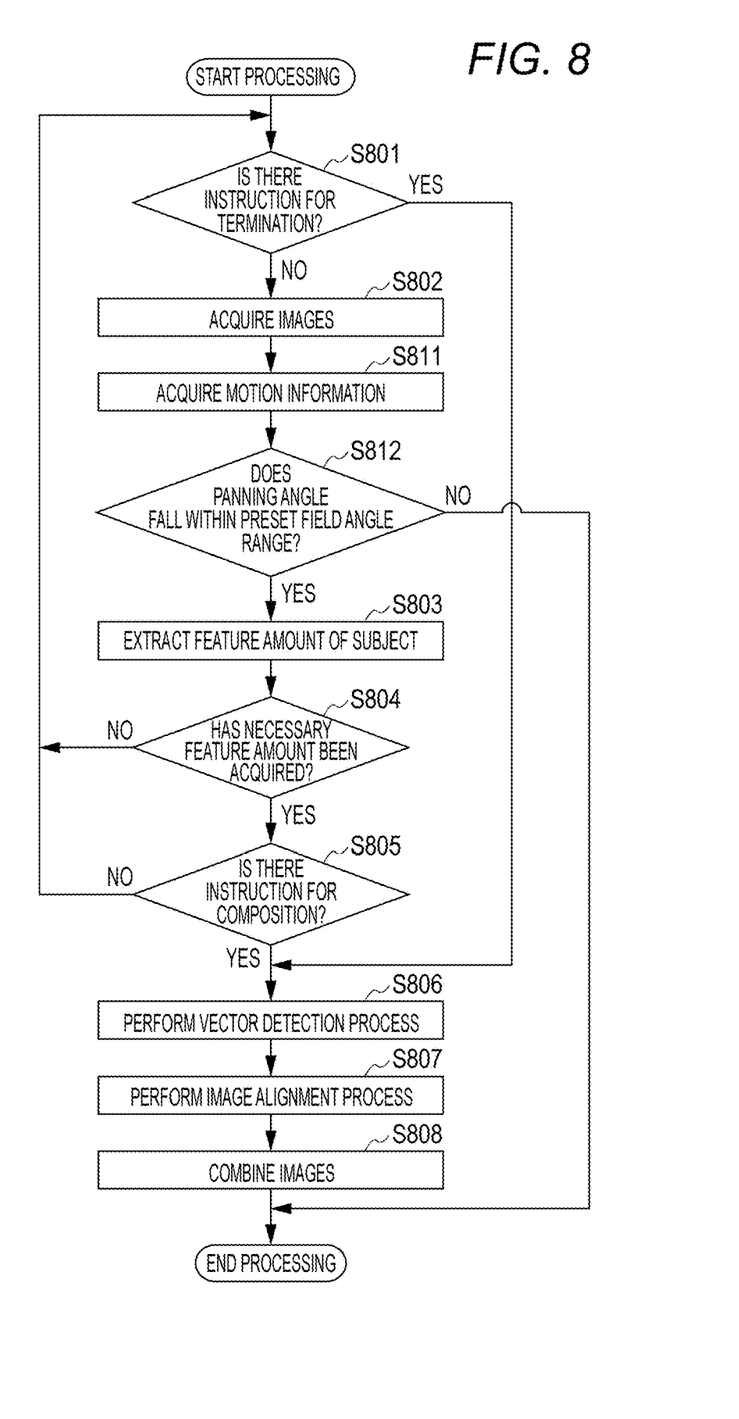
FIG. 8 is a flowchart of operations of the digital camera according to the second embodiment.

The second embodiment will be explained below focusing on the differences from the first embodiment with reference to the flowchart of FIG. 8. In the following description, the digital camera is panned as an example. However, the second embodiment is also applicable to the case where the digital camera is tilted. Steps S801, S802, and S803 to S808 described in FIG. 8 are the same as steps S201, S202, and S203 to S208 described in FIG. 2, respectively.

At step S802, an imaging element 105 converts a subject image formed by an optical system 104 into an image and outputs the same to an image processing circuit 106.

At step S811, the gyro sensor 709 acquires motion information of the digital camera. The motion information of the digital camera refers to the magnitude and direction of the angular speed when the digital camera is panned.

At step S812, the control circuit 101 integrates angular speed information that is generated by sampling two images acquired in a temporally continuous manner by panning at time intervals for imaging and is acquired by a gyro sensor 809 to calculate a panning angle.

Subsequently, the control circuit 101 determines whether the panning angle falls within a preset field angle range. When the panning angle does not fall within the preset range, the control circuit 101 terminates the process. When the panning angle falls within the preset range, the control circuit 101 moves to next step S803. In this example, when the foregoing preset field angle range corresponds to the field angle of the images acquired by the imaging element 105, this process refers to determining whether the panning angle falls within the field angle of the captured images. When the panning angle falls within the field angle of the captured images, there exists an overlapped region between the two images captured in a temporally continuous manner. In contrast, when there is no overlapped region between the two images captured in a temporally continuous manner, the panning angle does not fall within the field angle of the captured images, and the control circuit 101 cannot move to step S803 but terminates the process. That is, by setting the foregoing preset field angle range as the range of the field angle of the images acquired by the imaging element 105, it is possible to stop the process flow at step S912 when the digital camera is panned at a high speed at which there is no overlapped region between the continuous images. The field angle range can be changed by the user. When the user sets the field angle range to be narrow, it is necessary that there is a wider overlapped region between the two images captured in a temporally continuous manner to move to step S903 described in FIG. 9. Since the two images are combined in the overlapped region as described above, the wide overlapped region can reduce the influence of noise or the like. This user setting makes it possible to widen the overlapped region and acquire a higher-quality panoramic composite image.

The sequential steps are the same as those of the first embodiment and descriptions thereof will be omitted.

According to the second embodiment as described above, it is possible to terminate the process when the panning operation is too fast, thereby to prevent steps S801 to S804 to be repeated.

Third Embodiment

In a third embodiment, it is predicted, from the distribution of the feature amount of the subject in the reference image for alignment, to what degree the image is to be panned to satisfy the feature amount of the subject, and the images to be combined are selected based on the predicted panning angle. The internal configuration of an imaging apparatus is the same as that of the second embodiment and descriptions thereof will be omitted.

<Operations of a Digital Camera>

Operations of a digital camera 100 performing the panning operation in the third embodiment will be explained below. The parts similar to those of the first embodiment or the second embodiment will be briefly described. In the following description, the digital camera is panned as an example. However, the third embodiment is also applicable to the case where the digital camera is tilted.

Figure 9:
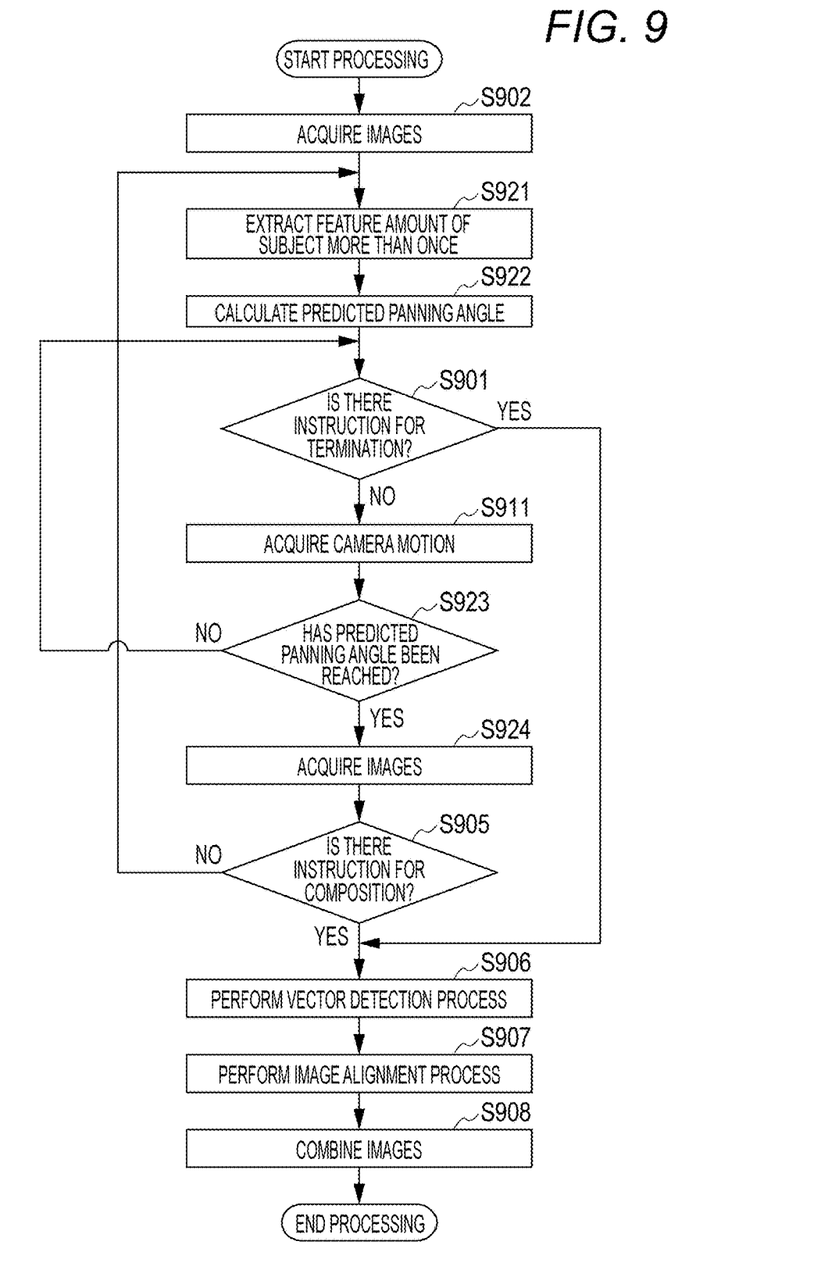
FIG. 9 is a flowchart of operations of the digital camera according to the third embodiment.

FIG. 9 is a flowchart of operations of the digital camera 100 according to the third embodiment.

At step S902, an imaging element 105 converts a subject image formed by an optical system 104 into an image and outputs the same to an image processing circuit 106. Images are continuously generated by the imaging element 105, and are used for display of the images captured during the panning operation.

At step S921, the feature amounts of the subject are extracted. This step is different from step S203 in the first embodiment in that a contrast extraction region is set for a reference image and the feature amounts are extracted while the contrast extraction region is changed more than once. Detailed explanations will be given below with reference to FIGS. 10A to 10C.

Figure 10A:
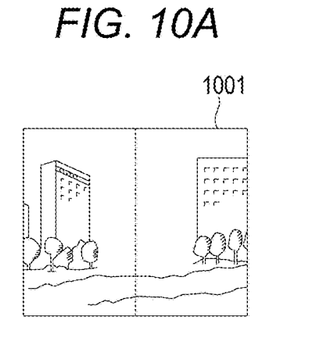
FIGS. 10A to 10C are diagrams for describing contrast extraction regions from which contrasts are extracted according to the third embodiment.
Figure 10B:
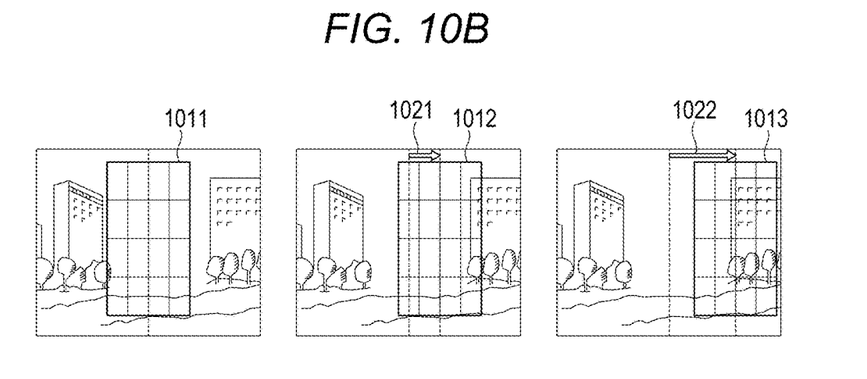

An image 1001 illustrated in FIG. 10A is a reference image in the vector detection process. When the vector detection is performed on the image 1001 for the first time, a central region 1011 of the image 1001 illustrated in FIG. 10B is set as a contrast extraction region. As the digital camera performs the panning operation to the right direction, the contrast extraction region moves rightward as illustrated as contrast extraction regions 1011, 1012, and 1013. Arrow 1021 or arrow 1022 indicates the moving amount of image plane when the contrast extraction region moves from region 1011 to region 1012 or region 1013. The contrast extraction regions 1031 to 1033 illustrated in FIG. 10C indicate the contrasts as the feature amounts of the subject in the small regions of the contrast extraction regions 1011 to 1013. The white regions are high in contrast, and the black regions are low in contrast.

Figure 10C:
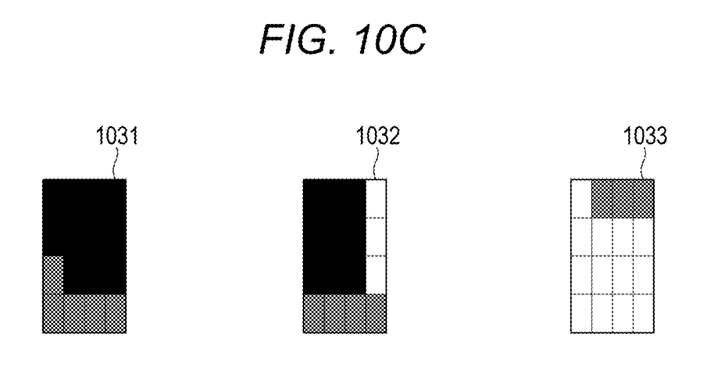

At step S922, based on the feature amounts of the subject in the contrast extraction regions extracted at step S921, the region from which the feature amount necessary for the alignment process can be extracted is selected, and the panning angle for reaching the image position corresponding to the region is calculated. The calculated panning angle will be called as predicted panning angle. In the example of FIG. 10C, the numbers of the small regions of the contrast extraction regions 1031 and 1032 that are determined to be high in contrast do not reach a threshold and the number of the small regions of the contrast extraction region 1033 reaches the threshold. Accordingly, the contrast extraction region 1033 is selected. When all the numbers of the small regions of a plurality of regions that are determined to be high in contrast reach the threshold, any one of them may be selected arbitrarily but the one with the smallest moving amount of image plane is preferably selected.

Next, a method for calculating the predicted panning angle will be described. First, the contrast extraction region in which the number of the small regions determined to be high in contrast is equal to or larger than the threshold is decided as target region. For example, when the threshold is set to be four, the region 1033 with more than four white blocks indicating high contrasts is decided as target region. In this case, the moving amount of image plane is 1022 and the panning angle of the digital camera 100 corresponding to the moving amount of image plane constitutes the predicted panning angle. Next, it is determined whether the panning angle of the digital camera 100 falls within a predetermined error range with respect to the predicted panning angle. When the panning angle of the digital camera 100 falls within the predetermined error range, the process of image selection at step S924 is carried out.

In this example, the moving amount of image plane is designated as s, the focal length as f, the angular speed as co, the number of images acquired in unit time during panning as r, and the pixel pitch as p, the panning angle θ can be determined by the following equation 3:

[Equation 3]

$$\theta = \left(-\frac{\omega}{r}\right) \approx \arctan\left(\frac{p*s}{f}\right) \quad \text{Equation (3)}$$

Alternatively, a mechanical driving unit for imparting motion such as rotation to the digital camera may be added, the speed of rotation may be decided in advance, and the predicted panning angle may be calculated using (equation 3) based on the speed of rotation. In this case, it is not necessary to acquire the motion of the camera.

At step S901, it is determined whether there is an instruction for termination. When there is an instruction for termination, the process moves to step S906, and when there is no instruction for termination, the process moves to step S911.

At step S911, motion information of the digital camera 100 during panning is acquired as at step S811 in the second embodiment.

At step S923, it is determined whether the panning angle of the digital camera 100 matches the predicted panning angle. To be more precise, it is determined whether the panning angel of the digital camera 100 falls within a predetermined value of error with respect to the predicted panning angle calculated at step S922. When the panning angel of the digital camera 100 does not fall within a predetermined value of error, the process returns to step S901, and when there is no instruction for termination, motion information is acquired again at step S911.

At step S924, out of the images generated by the imaging element 105 in time sequence, the image generated at the predicted panning angle is selected and output to the image processing circuit 106. The image selected at step S924 is used for the detection of a motion vector at step S906 and the image alignment at step S907. In addition, at step S924, the feature amount of the subject is extracted with the selected image as a reference image.

As explained above, in the third embodiment as well as the first embodiment, even though there are few subjects with feature amounts such as contrasts in adjacent regions, it is possible to generate a favorable panoramic image without failure at the stages of vector detection and composition.

Other Embodiments

The foregoing embodiments have been explained based on carrying out in the digital camera. However, the embodiments of the present invention are not limited to the digital camera. For example, embodiments of the present invention may be carried out in portable devices with a built-in imaging element or network cameras capable of acquiring images.

Embodiments of the present invention can also be implemented by a program for performing one or more of the functions in the foregoing embodiments, supplying the same to a system or a device via a network or a storage medium, causing one or more processors of a computer in the system or the device to read and operate the program. Alternatively, embodiments of the present invention can also be implemented by a circuit performing one or more of the functions (for example, ASIC).

According to the process explained above, it is possible to generate a favorable panoramic image even when the feature amounts of the subject between the adjacent images are small and it cannot be expected that widening the detection range would increase the feature amounts of the subject.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-058810, filed Mar. 23, 2016, which is hereby incorporated by reference herein in its entirety.

What is claimed is:

1. An image processing apparatus, comprising:
a CPU programmed to:
determine whether a feature amount in a partial region of an image satisfies a preset condition,
select, from a plurality of images, a second image to be combined with a first image based on the result of the determination,
detect a motion vector between the first image and the second image, and
perform a composition process on the aligned first image and second image based on the motion vector,
wherein, from the plurality of images, the CPU selects as the second image at least any one of an image having a partial region with the feature amount determined to satisfy the preset condition and an image corresponding to a partial region out of a plurality of partial regions set in the first image with the feature amount determined to satisfy the preset condition.

2. The image processing apparatus according to claim 1, wherein the plurality of images is images continuously captured in time series.

3. The image processing apparatus according to claim 2, wherein the CPU determines whether the feature amounts of captured images preceding or following the first image satisfy the preset condition one by one in the time series.

4. The image processing apparatus according to claim 2, wherein the CPU selects an image that has a partial region with the feature amount determined to satisfy the preset condition and has a region overlapping the first image as the second image.

5. The image processing apparatus according to claim 2, further comprising:
an obtaining circuit configured to acquire motion information of an imaging unit while capturing the images continuously captured in the time series,
wherein the CPU does not perform the composition process when there is no image in the images captured until the motion of the imaging unit obtained based on the motion information exceeds a predetermined range that has the feature amount determined to satisfy the preset condition.

6. The image processing apparatus according to claim 1, wherein the CPU determines whether the feature amounts in a plurality of partial regions different in position from the first image satisfy a preset condition, and
when there is a plurality of partial regions in the plurality of partial regions of the first image that have the feature amounts determined to satisfy the preset condition, the CPU selects the image corresponding to the partial region with the smallest amount of movement from the first image as the second image.

7. The image processing apparatus according to claim 1, wherein the CPU selects a new second image and regards the selected second image as a new first image.

8. The image processing apparatus according to claim 1, wherein the partial region includes a plurality of small regions, and
the CPU determines whether each of the feature amounts of the plurality of small regions satisfies a reference value.

9. The image processing apparatus according to claim 8, wherein the preset condition is that the number of the small regions with the feature amounts determined to satisfy the reference value is equal to or larger than a threshold.

10. The image processing apparatus according to claim 1, wherein the feature amount is at least any one of contrast and brightness.

11. The image processing apparatus according to claim 1, wherein the motion vector detection unit detects the motion vector using template matching.

12. An imaging apparatus comprising:
an imaging element configured to generate an image; and
a CPU programmed to:
determine whether a feature amount in a partial region of the image satisfies a preset condition,
select a second image to be combined with a first image from a plurality of images generated by the imaging element based on the result of the determination,
detect a motion vector between the first image and the second image, and
perform a composition process on the aligned first image and second image based on the motion vector,
wherein, from the plurality of images, the CPU selects as the second image at least any one of an image having a partial region with the feature amount determined to satisfy the preset condition and an image corresponding to a partial region out of a plurality of partial regions set in the first image with the feature amount determined to satisfy the preset condition.

13. An image processing method, comprising:
determining whether a feature amount in a partial region of an image satisfies a preset condition;
selecting, from a plurality of images, a second image to be combined with a first image based on the result of the determination at the determining;
detecting a motion vector between the first image and the second image; and
performing a composition process on the aligned first image and second image based on the motion vector,
wherein at the selecting, from the plurality of images, at least any one of an image having a partial region with the feature amount determined to satisfy the preset condition and an image corresponding to a partial region out of a plurality of partial regions set in the first image with the feature amount determined to satisfy the preset condition is selected as the second image.

14. A non-transitory computer-readable medium that stores a program for operating a computer in an image processing apparatus, upon execution of the program causing the computer to execute processing of:
determining whether a feature amount in a partial region of an image satisfies a preset condition;
selecting, from a plurality of images, a second image to be combined with a first image based on the result of the determination at the determining;
detecting a motion vector between the first image and the second image; and
performing a composition process on the aligned first image and second image based on the motion vector,
wherein at the selecting, from the plurality of images, at least any one of an image having a partial region with the feature amount determined to satisfy the preset condition and an image corresponding to a partial region out of a plurality of partial regions set in the first image with the feature amount determined to satisfy the preset condition is selected as the second image.

* * * * *